(12) United States Patent
Kelly

(10) Patent No.: US 9,812,953 B2
(45) Date of Patent: Nov. 7, 2017

(54) DC-DC CONVERTER WITH CONFIGURABLE COMPENSATOR

(71) Applicant: ZENTRUM MIKROELEKTRONIK DRESDEN AG, Dresden (DE)

(72) Inventor: Anthony Kelly, Old Kildimo (IE)

(73) Assignee: IDT Europe GmbH, Dresden (DE)

( * ) Notice: Subject to any disclaimer, the term of this patent is extended or adjusted under 35 U.S.C. 154(b) by 0 days.

(21) Appl. No.: 14/893,213

(22) PCT Filed: Jul. 1, 2014

(86) PCT No.: PCT/EP2014/063987
§ 371 (c)(1),
(2) Date: Nov. 23, 2015

(87) PCT Pub. No.: WO2015/000916
PCT Pub. Date: Jan. 8, 2015

(65) Prior Publication Data
US 2016/0094120 A1  Mar. 31, 2016

Related U.S. Application Data

(60) Provisional application No. 61/842,666, filed on Jul. 3, 2013.

(51) Int. Cl.
*H02M 3/04* (2006.01)
*H02M 3/156* (2006.01)
(Continued)

(52) U.S. Cl.
CPC ............. *H02M 3/04* (2013.01); *H02M 3/156* (2013.01); *H02M 3/157* (2013.01); *H02M 2001/0025* (2013.01)

(58) Field of Classification Search
CPC ............. H02M 3/04; H02M 3/155; H02M 3/156–3/158; H02M 3/1588; G01R 19/0084; Y02B 70/1466; G05F 1/62
(Continued)

(56) References Cited

U.S. PATENT DOCUMENTS 6,952,093 B1 * 10/2005 Broach ................ H02M 3/156
323/282
7,432,692 B2   10/2008 Wang et al.
(Continued)

FOREIGN PATENT DOCUMENTS

CN   101834554 A   9/2010
CN   102754332 A   10/2012
(Continued)

OTHER PUBLICATIONS

International Search Report for PCT/EP2014/063987 dated Sep. 26, 2014.
(Continued)

*Primary Examiner* — Yemane Mehari
(74) *Attorney, Agent, or Firm* — Helsin Rothenberg Farley & Mesiti P.C.

(57) ABSTRACT

A controller of a power converter and related method pre-determine a range of suitable compensators across an end user's design space and permit the end user to configure the compensator such that the most suitable compensator is selected.

12 Claims, 5 Drawing Sheets

(51) Int. Cl.
*H02M 3/157* (2006.01)
*H02M 1/00* (2006.01)

(58) Field of Classification Search
USPC .......................... 323/234, 271, 282–285, 290
See application file for complete search history.

(56) References Cited

U.S. PATENT DOCUMENTS

2009/0284235 A1     11/2009  Weng et al.
2016/0141954 A1*    5/2016   Kelly ..................... H02M 1/36
                                                    323/234

FOREIGN PATENT DOCUMENTS

EP        2704300 A1     3/2014
WO     2012062795 A1     5/2012

OTHER PUBLICATIONS

Office Action dated Aug. 1, 2017 issued in corresponding Chinese application No. 201480037184.7.

\* cited by examiner $$K \frac{(z-z_1)(z-z_2)}{(z-1)(z-p_1)(z-p_2)}$$

DC-DC CONVERTER WITH CONFIGURABLE COMPENSATOR

CROSS REFERENCE TO RELATED APPLICATIONS

This application is a national stage filing under section 371 of International Application No. PCT/EP2014/063987, filed on Jul. 1, 2014, and published in English on Jan. 9, 2015, as WO 2015/000916 A1, which claims priority of U.S. Provisional Application No. 61/842,666 filed on Jul. 3, 2013, the entire content of said applications being hereby incorporated herein by reference.

FIELD OF THE INVENTION

The present disclosure relates to DC-DC conversion with configurable compensators and related method for the purpose of stability and regulation.

BACKGROUND OF THE INVENTION

In DC-DC conversion controllers are generally compensated for the purposes of stability and regulation.

A typical DC-DC converter arrangement is shown in FIG. 1.

The DC-DC converter arrangement comprises a switchable power stage 11, wherein an output voltage is generated according to a switching signal and an input voltage. The switching signal is generated in a digital controller 16 that adjusts the output voltage to a reference voltage. The driver 17 translates the switching signal to individual switching signals for the high-side switch 12 and the low side-side switch 13. The switchable power stage further comprises an inductor 14 shown in terms of inductance and equivalent series resistance and a capacitor 15 shown in terms of its capacitance and equivalent series resistance (ESR). During a charge phase, the high-side switch is turned on and the low-side switch is turned off by the switching signal to charge the capacitor. During a discharge phase the high-side switch is turned off and the low-side switch is turned on to match the average inductor current to the load current.

The switching signal may be generated as digital pulse width modulation (PWM) signal with a duty cycle determined by a control law. The controller 16 may be employ analogue or digital compensation schemes when operating in PWM.

Controllers that employ analogue compensators typically rely on compensation networks that are fixed using resistors and capacitors connected to the controller IC pins as shown in FIG. 2 where an output voltage $V_{OUT}$ is compared to a reference voltage $V_{REFERENCE}$ by comparator 21 to generate an error voltage $V_{COMP}$. Sometimes the compensation components are internal to the IC.

In DC-DC POL modules, a tuneable-loop concept has been developed as disclosed in U.S. Pat. No. 7,432,692, 2008 to allow variation of the loop compensation by attaching resistors and capacitors to the pins of the module to override the compensation the module manufacturer has configured internally. Determining suitable values for the external components is typically performed by the module user by way of tables or formulae.

Controllers that employ digital compensators as shown in FIG. 3 typically use a graphical user interface (GUI) and communication bus 18 (FIG. 2) to calculate suitable compensation parameters and communicate those values to the controller IC which then may be stored into non-volatile memory 19 (FIG. 2).

However, module end users may not have the required communication bus at their disposal or may not desire to utilise the GUI because of the complexity of such a task. Adaptive controllers may be employed to obviate this need, but the frequency and phase characteristics of the final system after adaptive control compensation has converged can be unpredictable and therefore the response cannot be pre-determined to any suitable degree of certainty.

Furthermore, control methods may adopt different modes in which the selected coefficients change according to the mode of operation. Typically, adaptive controllers perform poorly in this situation because the learning of the adaptive loop is disrupted by the mode changes As mentioned, in DC-DC conversion controllers are generally compensated for the purposes of stability and regulation. However, the requirement to design a robust controller that is stable over all power stage parameter values and conditions is at odds with the requirement to maximize regulation performance. It is especially difficult in the case of DC-DC POL modules to determine and select a suitable compensator because
  a) the output capacitance of the end user is typically not well defined when the module manufacturer determines the compensation and
  b) the end user has limited means or skill in determining and configuring the correct compensation once the output capacitance is well defined.

Therefore what is required is a compensator for a power converter that is easy to configure and optimally regulates.

DISCLOSURE OF THE INVENTION

It is an objective of the present disclosure to provide a compensator for a power converter that is easy to configure and re-configure, specifically for alternative power stage parameters, particularly the bulk capacitance.

The present invention relates to a controller for controlling a power stage of a power converter according to a control law. The control law implements a specific type of compensator and is pre-designed to generate an optimal response of a default power converter for a default parameter value of a component of the power stage.

However, an actual parameter value of the component of the power stage may be different from the default parameter value. Therefore, the controller is further configured to alter the control law for the actual parameter value of the component of the power stage such that the optimal response is retained. The power stage may comprise means to identify the actual parameter value.

Specifically, the control law may be defined by poles and zeros. The controller may then be configured to alter the control law by shifting the poles such that a relationship between the poles and zeros of the default power converter and the power converter is maintained. The skilled person will appreciate the same principle can be applied to the zeros of the control law.

Moreover, the controller may be configured to alter the control law by selecting another type of compensator of a plurality of types of compensators. The controller may alter the control law implementing the other type of compensator for the actual parameter value such that optimal response corresponding to the other type of compensator and default power converter is retained.

Specifically, the controller may optimize over the plurality of types of compensators by altering the control law of each of the plurality of types of compensators for the actual parameter value such that the optimal response of each of the plurality of types of compensators is retained. The type of compensator with altered control law that yields the overall optimal response is then employed for operating the power converter.

Furthermore, a user may be enabled to choose the type of compensator manually. For this purpose, the power converter may comprise a communication bus for providing a select signal to the controller according to which the controller selects the type of compensator. However, the select signal may also originate from another top level controller.

Default control laws for the plurality of types of compensators, i.e. control law coefficients, may be stored to non-volatile memory from which the controller retrieves the control law under consideration.

Furthermore, several default compensators may be optimally designed for various power stage types, for example, high esr bulk capacitors, various inductor values. The most appropriate default compensator may be selected as appropriate. The selected default compensator may be adjusted according to a function such that the optimal response corresponding to the adjusted compensator and default power converter is retained.

The present invention further relates to a method for controlling a power stage of a power converter according to a control law, the control law implementing a specific type of compensator. The method comprises providing the control law being pre-designed to generate an optimal response of a default power converter for a default parameter value of a component of the power stage; determining an actual parameter value of the component of the stage; and altering the control law for the actual parameter value of the component of the power stage such that the optimal response is retained.

One aspect of the method relates to altering the control law. This may be achieved by selecting another type of compensator of a plurality of types of compensators and altering the control law implementing the other type of compensator for an actual parameter value of the component of the power stage such that an optimal response of the other type of compensator is retained.

The method may further comprise optimizing for a type of compensator of the plurality of types of compensators and the corresponding control law.

Thus, the present invention provides a controller for controlling a power stage of a power converter that can be configured by simply selecting from a plurality of pre-designed compensators and/or adjusting said compensators according to a function by use of the digital communication bus or without the use of the digital communication bus if desired and a method for determining, configuring and storing pre-designed compensators such that suitable compensators are employed over a wide range of power converters.

BRIEF DESCRIPTION OF THE DRAWINGS

Reference will be made to the accompanying drawings, wherein.

DETAILED DESCRIPTION OF THE INVENTION

For the sake of example, the invention will be described in relation to the PID embodiment, although it will be clear that the same principles can be realised equivalently in any other embodiment. Let the proportional, integral and derivative gains be identified as $K_p$, $K_i$ and $K_d$ respectively.

Figure 1:
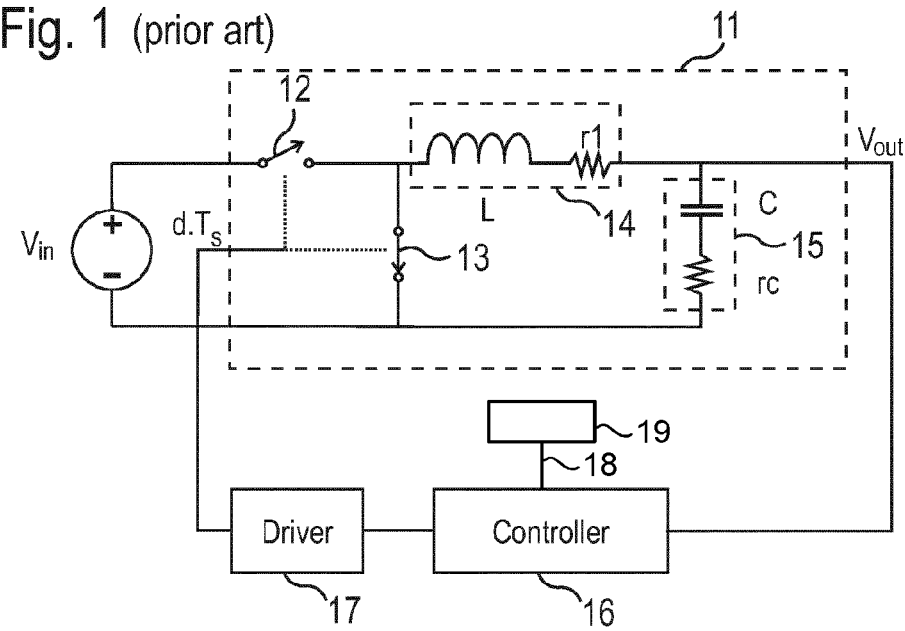
FIG. 1 shows a typical DC-DC converter in buck topology.
Figure 2:
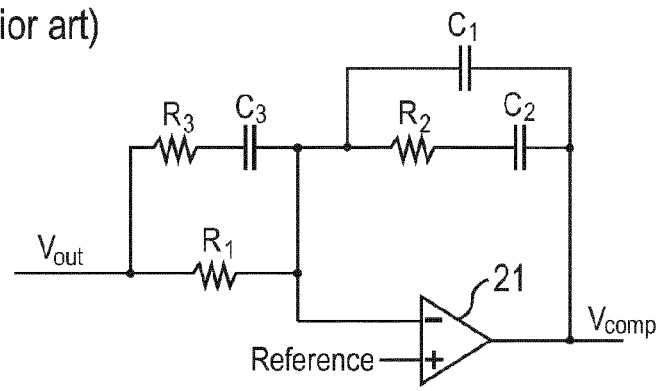
FIG. 2 shows a compensation network of prior art.
Figure 2:
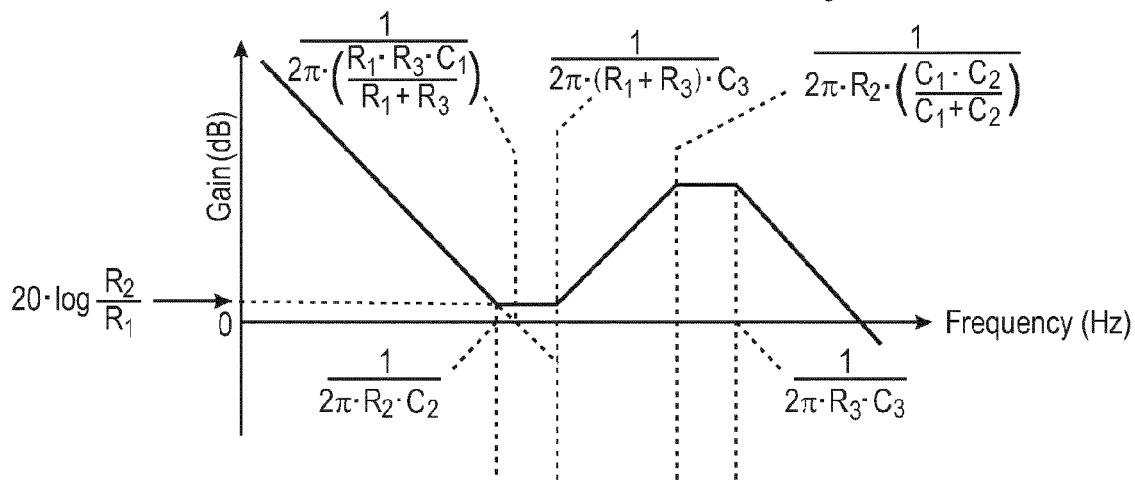
Figure 3:
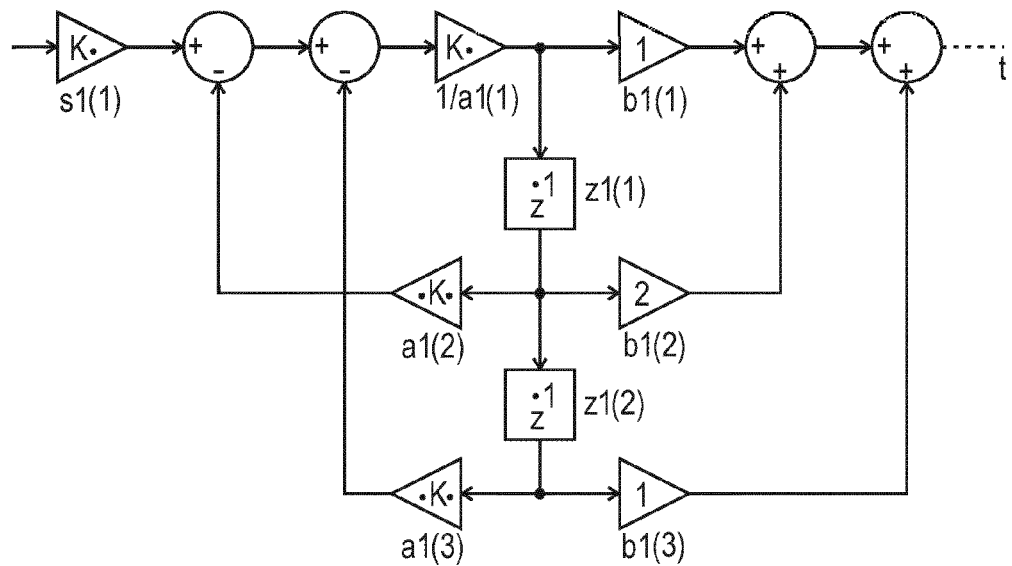
FIG. 3 shows a typical digital compensator of prior art.
Figure 3:
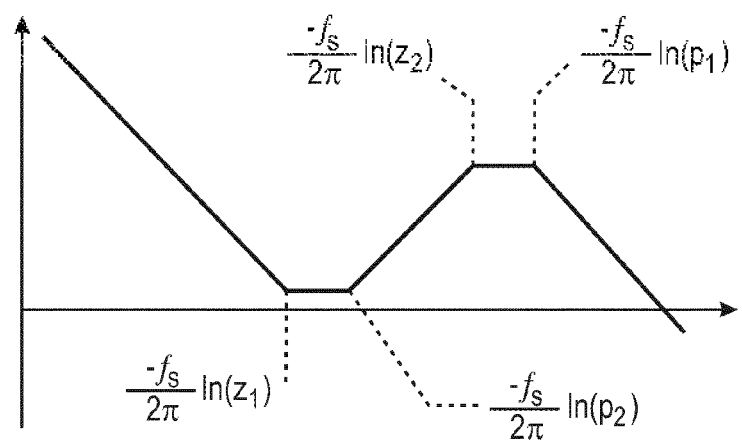

Referring back to the buck converter of as shown in FIG. 1, it is well known to one skilled in the art that compensation of the controller should be performed for the most critical component and parameter values in order to guarantee stability of the converter under all conditions. The output bulk capacitance C, is often the component value or parameter that is known with least certainty, and therefore using this as an example, the compensation would be designed for the lowest value of capacitance expected in the converter.

Figure 4:
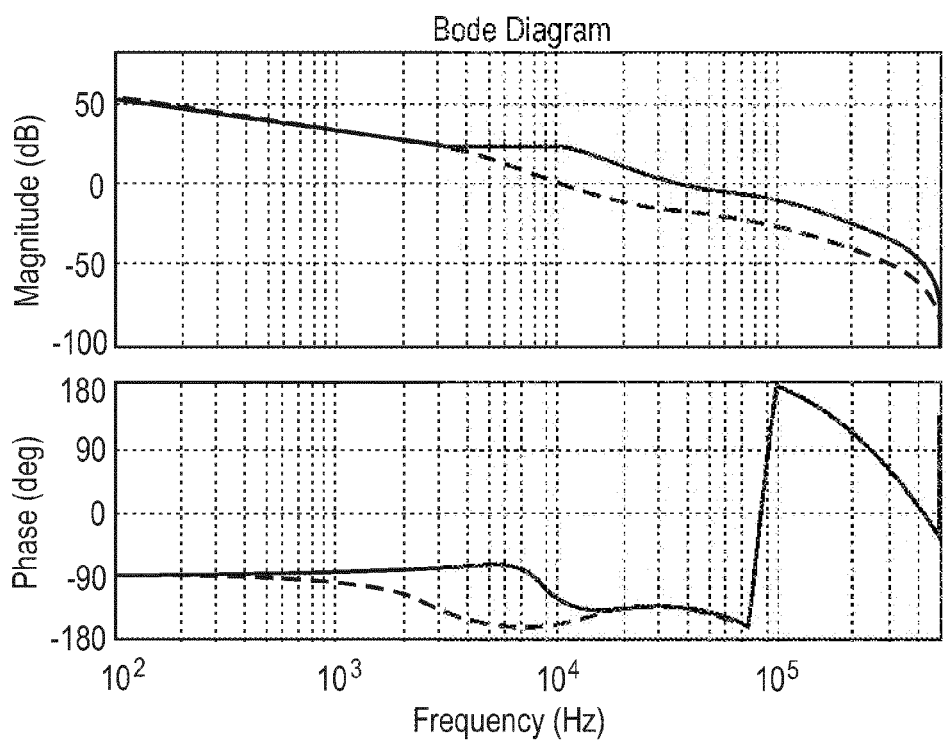
FIG. 4 shows a bode plot of exemplary system with varying capacitance C.

The Bode plot of the open loop gain of such a system is shown in FIG. 4 (full line). The dotted line of FIG. 4 shows that the loop response changes dramatically when the capacitance C changes, by a factor of 6 in this example.

Given that the compensator was designed to optimise the response of the original system, then clearly the resulting response with the changed value of C is far from optimised.

Considering that it is advantageous to retain the response of the original power converter as the capacitance C is changed, then what is desired, is to determine the manner in which the compensator must change in order to achieve a similar response. That is, this objective can be realised by designing a base compensator in the usual way, and devising a means to alter the compensation according the new value of C so as to maintain system performance.

Figure 5:
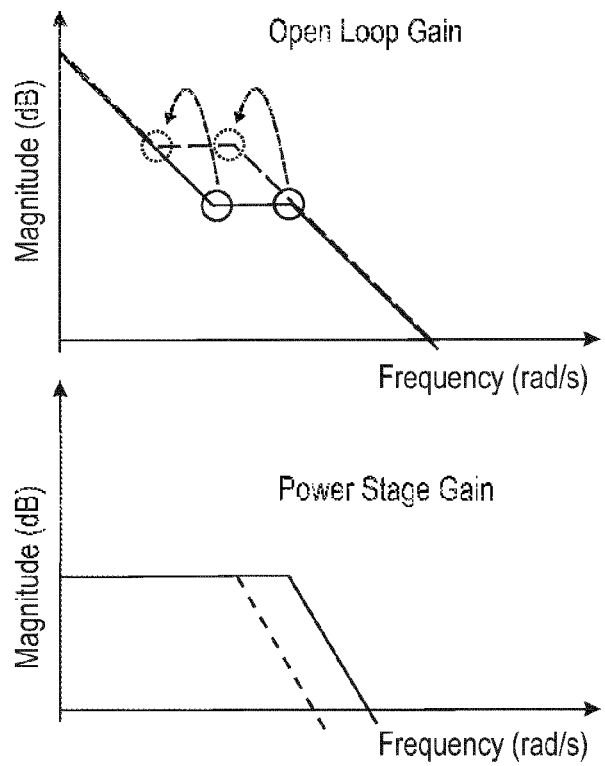
FIG. 5 shows the open loop gain and power stage gain response for the default power converter (full line) and the actual power converter with increased capacitance (dotted line)

Varying parameters of the power stage, for example C, alters the poles and zeros of the power stage. If the relationship can be maintained between the poles and zeros of the original power stage/compensator and the new power stage/compensator then it can be observed that the overall system response remains largely similar. This is illustrated diagrammatically in FIG. 5, where the open loop gain magnitude can be made to cross the 0 dB axis at the same point by moving the zeros back in frequency according to the reduction in power stage pole frequency.

It can be seen that this relationship can be maintained, for example, if the $K_p$, $K_i$ and $K_d$ values are altered from the default values in the following manner:

$$F = C_{actual}/C_{default}$$

$$K_{i,altered} = K_{i,default} * \text{sqrt}(F)$$

$$K_{d,altered} = K_{d,default} * F$$

$$K_{p,altered} = K_{p,default} * F.$$

where $K_{i,default}$, $K_{p,default}$ and $K_{d,default}$ represent the gains of the default controller, i.e. default set of compensator coefficients, $K_{i,altered}$, $K_{p,altered}$, $K_{d,altered}$ represent the altered values respectively to maintain the system response and $C_{actual}$ and $C_{default}$ represent the actual and default value of the bulk capacitance.

Figure 6:
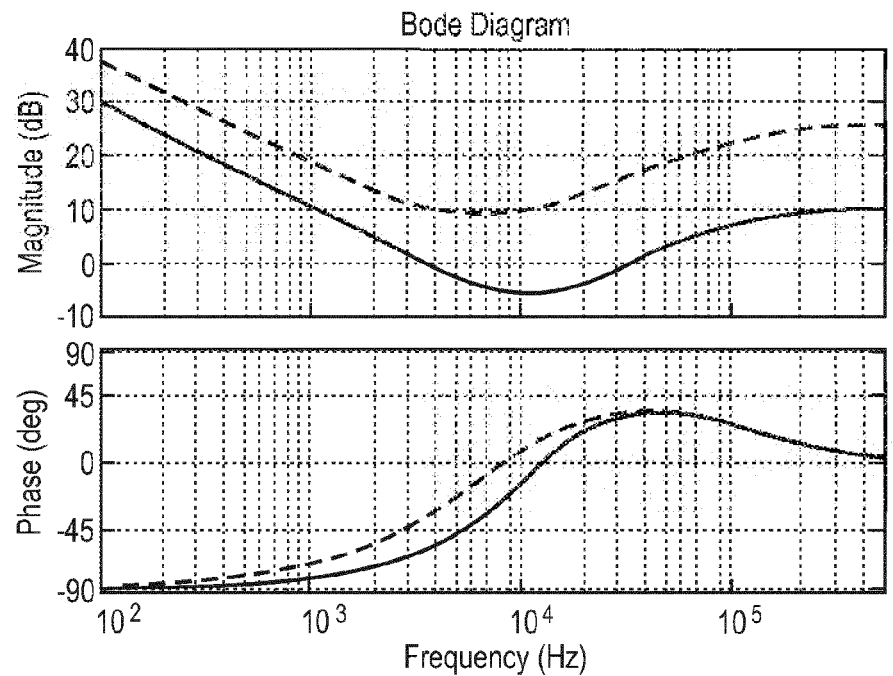
FIG. 6 shows the bode plot of the default compensator (full line) and the actual compensator according to the invention (dotted line)

FIG. 6 shows how the compensator response is changed when the above mentioned principles are applied when the capacitance is increased by a factor of six; i.e. F=6. It is clear that the zeros of the compensator have reduced in frequency by changing the compensator coefficients in this way.

Figure 7:
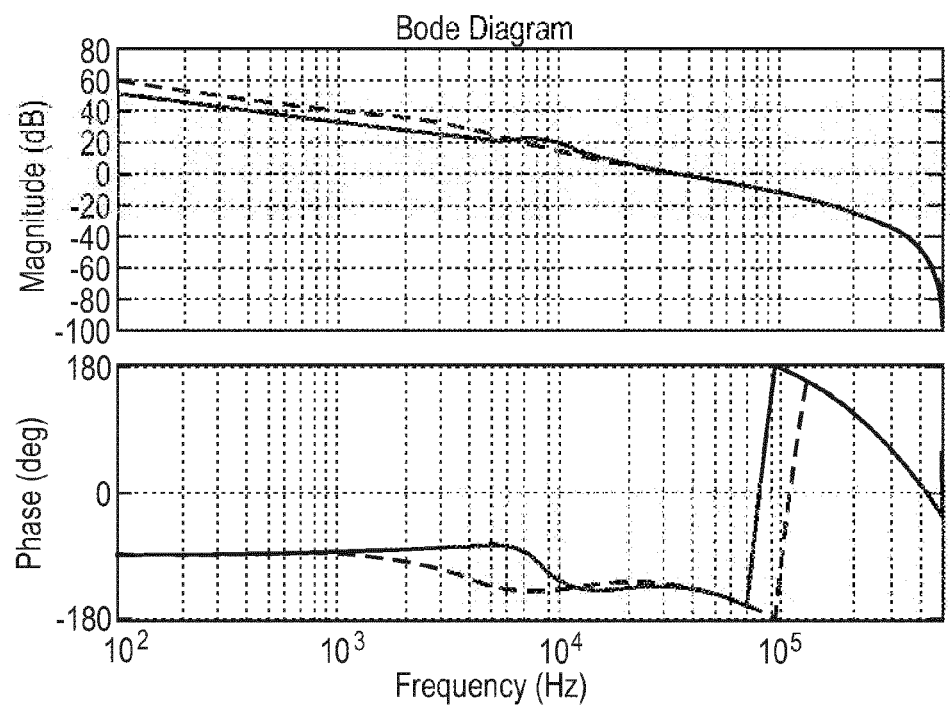
FIG. 7 shows the bode plot of default power converter loop gain/phase (full line) and the actual power converter (dotted line).

FIG. 7 shows how the loop response is maintained when the above mentioned principles are applied when the capacitance is increased by a factor of six; i.e. F=6. It is clear that the loop response in terms of phase margin and loop bandwidth is maintained according to the design objectives of the original system. The effectiveness of the present solution can be observed by comparing it to FIG. 4 where the same system did not benefit from altered compensator coefficients.

The invention has been illustrated in terms of an exemplary system in which only the poles of the power stage have moved compared to the default system, i.e. default power converter. It will be obvious to those skilled in the art that zeros (for example ESR zeros) can treated in a similar manner with poles of the compensator moving to maintain a corresponding relationship with the zeros of the power stage; and is applicable to many power stage topologies.

In order to configure the controller to alter its response for various power stage parameter values, the controller includes a base (or default) compensator whose coefficients are programmable by a state-machine or micro-controller that alters the coefficients in response to its configuration according to the principles laid out in this invention. The said configuration may be communicated to the device via an interface bus in serial or in parallel, or may be configured by measuring a voltage on the device pins during a configuration phase or by measuring the value of a configuration resistor during a configuration phase.

The controller may include a nonvolatile memory to store the base or original coefficients. The changed compensator coefficients may be calculated on the fly in the controller in response to the configuration or may be pre-computed and stored in memory to be selected according to the configuration at run time.

The system may incorporate user feedback to select another set of compensator coefficients in order to further optimize the system response in cases where the power stage parameters are not known precisely.

It will be appreciated that control methods exist in which the compensator coefficients depend on the operating mode, for example PULSE WIDTH MODULATION POWER CONVERTER AND CONTROL METHOD, PCT/EP2011/069725. It will be advantageous to adjust some or all of the various compensator coefficients according to the said modes in the manner according to the teachings of this disclosure. In this way the various modes remain consistently configured and/or adjusted such that the optimal response corresponding to the default power converter is retained.

Although illustrated in the embodiment of a digital compensator it will be clear to those skilled in the art that the principles taught by this invention are equally applicable to analogue compensators where alteration of the compensation coefficients can be achieved by employing many well-known techniques such as R-DACs, Switched capacitors, summing fixed compensators, variable gm-C filters etc.

To summarize, disclosed is a method to pre-determine a range of suitable compensators across the end users design space and a means for the end user to configure the compensator such that the most suitable compensator is selected.

The invention claimed is:

1. A controller for controlling a power stage of a power converter according to a control law, the control law implementing a specific type of compensator and being pre-designed to generate an optimal response of a default power converter for a default parameter value of a component of the power stage; the specific type of compensator being any of P, I, D, PI, ID or PID; the controller being further configured to alter the control law for an actual parameter value of the component of the power stage such that the optimal response is retained by
   adjusting a proportional gain according to a ratio of the actual parameter value and the default parameter value by multiplying a default proportional gain corresponding to the default parameter value by the ratio if the compensator is any of P, PI or PID type;
   adjusting a integral gain according to a ratio between the actual parameter value and the default parameter value by multiplying a default integral gain corresponding to the default parameter value by a square root of the ratio if the compensator is any of I, PI and PID type; and
   adjusting a differential gain according to a ratio between the actual parameter value and the default parameter value by multiplying a default differential gain corresponding to the default parameter value by the ratio if the compensator is any of D, ID or PID, type.

2. The controller according to claim 1, wherein the control law is defined by poles and zeros; and the controller is configured to alter the control law by shifting the poles such that a relationship between the poles and zeros of the default power converter and the power converter is maintained.

3. The controller according to claim 1, wherein the control law is defined by poles and zeros; and the controller is configured to alter the control law by shifting the zeros such that a relationship between the poles and zeros of the default power converter and the power converter is maintained.

4. The controller according to claim 1, wherein the component comprises a capacitor, and the default parameter value and the actual parameter value comprise a capacitance.

5. The controller according to claim 1, further configured to alter the control law by selecting another type of compensator of a plurality of types of compensators and by altering the control law implementing the another type of compensator for an actual parameter value of the component of the power converter such that an optimal response of the another type of compensator corresponding to the default power converter is retained.

6. The controller according to claim 5, further configured to optimize for a type of compensator of the plurality of types of compensators and the corresponding control law.

7. The controller according to claim 1, comprising a first set of control law coefficients being selected when a steady state is detected, and a second set of control law coefficients being selected when a load transient is detected.

8. A power converter comprising a controller according to claim 1, and a communication bus for providing a select signal to the controller according to which the controller selects the type of compensator from a plurality of types of compensators.

9. The power converter according to claim 8, further comprising a non-volatile memory for storing the plurality of types of compensators.

10. A method for controlling a power stage of a power converter according to a control law comprising a controller according to claim 1, the control law implementing a specific type of compensator, the method comprising:
  providing the control law being pre-designed to generate an optimal response of a default power converter for a default parameter value of a component of the power stage;
  determining an actual parameter value of the component of the stage; and
  altering the control law for the actual parameter value of the component of the power stage such that the optimal response is retained.

11. The method according to claim 10, wherein altering the control law comprises selecting another type of compensator of a plurality of types of compensators and altering the control law implementing the another type of compensator for an actual parameter value of the component of the power stage such that an optimal response of the another type of compensator is retained.

12. The method according to claim 11, further comprising:
  optimizing for a type of compensator of the plurality of types of compensators and the corresponding control law.

* * * * *